Feb. 19, 1974  R. W. HEISLER  3,793,427
METHOD OF FORMING THE BELL END OF A BELL AND SPIGOT JOINT
Filed April 3, 1972  2 Sheets-Sheet 2

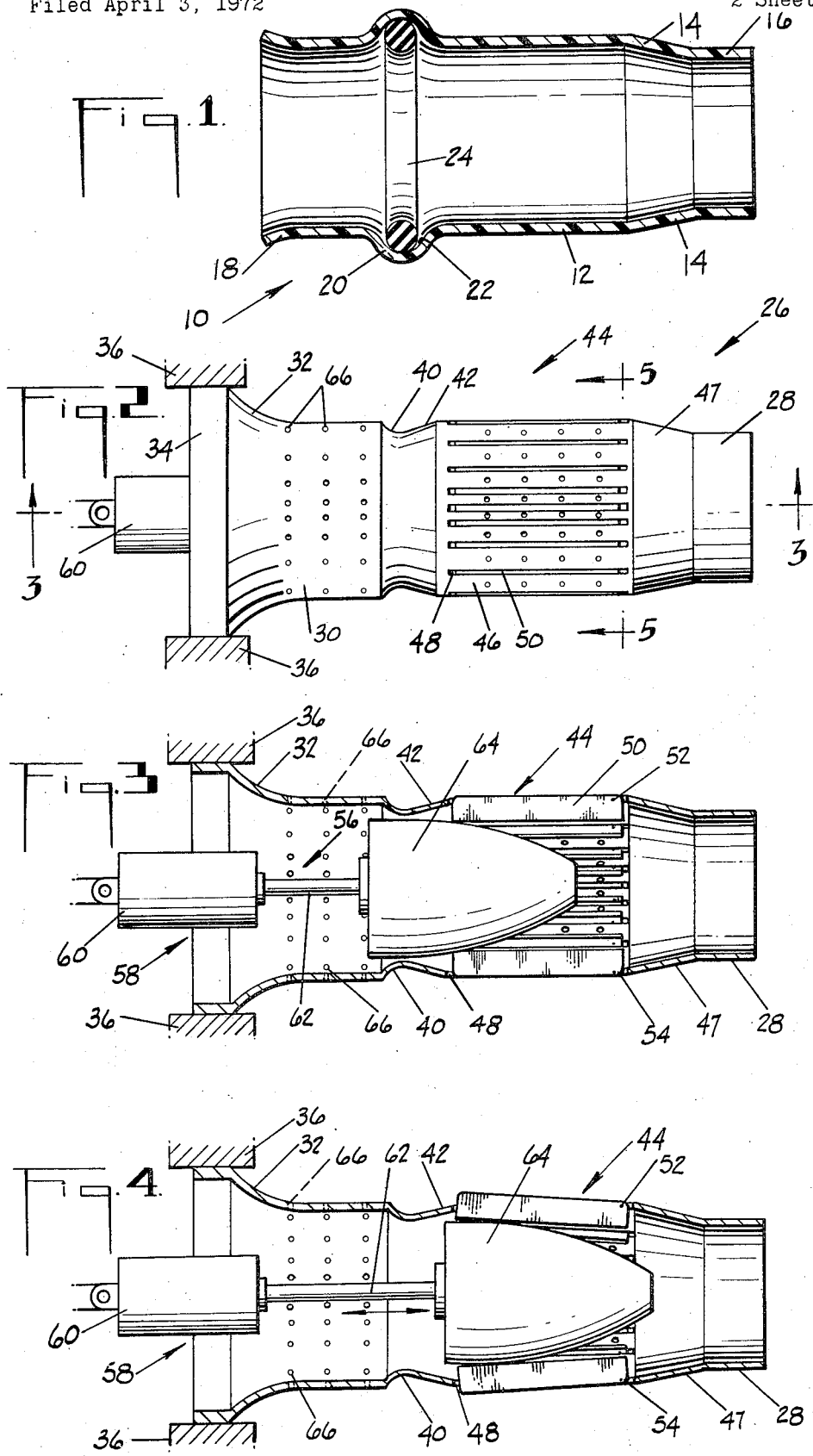

United States Patent Office 3,793,427
Patented Feb. 19, 1974

3,793,427
METHOD OF FORMING THE BELL END OF A BELL AND SPIGOT JOINT
Robert Walter Heisler, Somerville, N.J., assignor to Johns-Manville Corporation, New York, N.Y.
Filed Apr. 3, 1972, Ser. No. 240,401
Int. Cl. B29d 3/02; B29c 17/02
U.S. Cl. 264—249    5 Claims

ABSTRACT OF THE DISCLOSURE

A method of forming the bell end of a bell and spigot joint connecting two pipes together is disclosed herein and utilizes a mandrel assembly including an elongated core and a retractable ramp arrangement. A sealing gasket is positioned around the core and to one side of the ramp arrangement. Thereafter, an end section of a heat deformable pipe, heated to its deformable state, is moved concentrically over the core, retractable ramp arrangement and sealing gasket to form an enlarged sleeve or bell having an inner circumferential groove within which the sealing gasket is located. During this movement, as the heated end section approaches the sealing gasket, the ramp arrangement causes the end section to deform outwardly and over the gasket, whereupon the ramp arrangement retracts inwardly for allowing the outwardly deformed end section to shrink back to the core and around the gasket.

BACKGROUND OF THE INVENTION

Field of the invention

The present invention is directed generally to the formation of pipe joints and more particularly to the formation of the bell end of a bell and spigot joint.

DISCUSSION OF THE PRIOR ART

As is well known in the art, the female counterpart member or bell end of a bell and spigot joint, connecting two pipes together includes an elongated bell-shaped sleeve having an inner circumferential groove and a sealing gasket disposed within the groove. One common method of forming the bell end is to insert a core, with a gasket positioned thereon, concentrically into a heated end section of a heat deformable pipe. In this manner, the heated end section deforms around the gasket and ultimately conforms to the contour of the core and gasket to form a bell-shaped sleeve displaying the aforedescribed groove around the sealing gasket.

In many cases, the aforedescribed method requires the utilization of some sort of separate means for carrying the end section of the heat deformable pipe over the gasket during the formation process. Heretofore, one typical way of of achieving this has been to position a retainer ring having a tapered side surface on the core and adjacent to the sealing gasket. As the heated end section approaches the gasket, the tapered surface of the retainer ring causes the end section to deform outwardly and over the gasket. The retainer ring, of course, remains within the ultimately formed circumferential groove along with the sealing gasket.

While the utilization of the aforedescribed retainer ring is in certain cases satisfactory for directing the heated end section over the sealing gasket, it does create drawbacks. For example, the retainer ring adds to the cost in producing the bell end of a bell and spigot joint as well as requiring additional tolerance limitations. Further, in many cases, the retainer ring and sealing gasket must be of compatible design for maintaining the latter in place within the inner circumferential groove. Hence, changing from one type of gasket to another would require changing to a different type of retainer ring which can be inconvenient and/or expensive.

BRIEF SUMMARY OF THE INVENTION

In accordance with the foregoing deficiencies of the prior art as well as other deficiencies thereof, an object of the present invention is to provide a new and improved method of forming the bell end of a bell and spigot joint in one end of a heat deformable pipe.

Another object of the present invention is to provide a new and improved method of forming the aforestated bell end without utilizing retainer rings or other such deforming means in the formation thereof.

These and other objects and features of the present invention will become apparent from the following descriptions.

DESCRIPTION OF THE DRAWINGS

In the drawings:
FIG. 1 is a frontal cross-sectional view of bell end of a bell and spigot joint formed in accordance with the present invention;
FIG. 2 is a frontal view of a mandrel assembly designed in accordance with the present invention and preferably utilized in forming the bell end of FIG. 1;
FIG. 3 is a sectional view taken along line 3—3 in FIG. 2;
FIG. 4 is a sectional view similar to FIG. 3, however, with the mandrel assembly in a different operating position.

DETAILED DESCRIPTION

Figure 5:
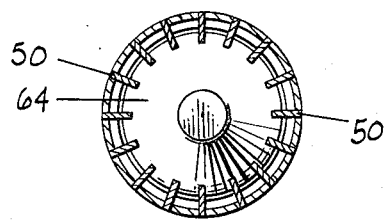
FIG. 5 is a sectional view taken along line 5—5 in FIG. 2.

The present invention is directed to a new and improved method of forming the bell end of a bell and spigot joint in an uncomplicated, reliable and economical fashion, without requiring the use of the aforedescribed retainer ring or other similar means in the forming process. In accordance with a preferred method, a heated end section of a heat deformable pipe is moved concentrically over a gasket supporting elongated core, the latter comprising part of a mandrel assembly designed in accordance with the present invention. By ultimately contouring the heated end section around the core and gasket, the bell end is formed and takes the shape of an enlarged bell-shaped sleeve having an inner circumferential groove with the gasket disposed therein.

In order to form the aforestated circumferential groove around the core supported gasket, the heated end section, in most cases, must be gradually deformed outwardly as it approaches the gasket along the core. This is to allow the end section to pass over the gasket without hanging up on one side thereof. One way in which the required gradual outward deformation may be accomplished is by utilizing an appropriately designed retainer ring in the manner set forth hereinabove. However, in accordance with a preferred embodiment of the present invention, a retractable ramp arrangement, also part of the aforestated mandrel assembly, is utilized in outwardly deforming the heated end section. Specifically, as the end section approaches the sealing gasket along the core, it moves up the ramp arrangement, thereby deforming outwardly and over the gasket. After the end section has passed over the gasket by a sufficient amount, the ramp arrangement is retracted inwardly for allowing the end section to shrink around the gasket. In this manner, a gasket of any suitable design may be provided in forming the bell end without requiring, for example, a complementary retainer ring or other such means.

Turning now to the drawings, wherein like components are designated by like reference numerals throughout the various figures, the bell end 10 of a bell and spigot joint, formed in accordance with the present invention, is shown in FIG. 1. Bell end 10 is formed from one end section of a pipe constructed of a heat deformable material such as, for example, polyvinylchloride and includes an enlarged bell-shaped sleeve 12 which tapers inwardly at 14 and merges with the undeformed section 16 of the pipe. While the heat deformable pipe and therefore the enlarged sleeve will be described and illustrated as having a circular cross-section, it is to be understood that other cross-sectional configurations are contemplated.

As illustrated in FIG. 1, the inner diameter of sleeve 12 is slightly larger than the outer diameter of undeformed section 16. Hence, the sleeve is adapted to receive the male counter-part member or spigot (not shown) of the bell and spigot joint in a coaxial fashion, the spigot having an outside diameter equal to that of undeformed pipe section 16. In this regard, the free end of sleeve 12 is preferably flared outwardly at 18 in order to facilitate insertion of the spigot. In addition, sleeve 12 includes an enlarged annular furrow 20 which defines an inner circumferential channel or groove 22. An annular sealing gasket 24 constructed of, for example, hard rubber is disposed within the groove and extends inwardly a substantial distance beyond the inner surface of the sleeve. In this manner, the gasket provides a reliable seal between the spigot and bell end of the bell and spigot joint.

While gasket 24 is shown as an O-ring having a circular profile, it should become apparent hereinafter that the present invention is not limited to such a profile. In fact, one advantage in using the forming method of the present invention is that gaskets of various profiles are quite compatible therewith.

Turning to FIGS. 2 to 4, attention is directed to a mandrel assembly 26 which is constructed in accordance with the present invention and which is preferably utilized in the formation of bell end 10. The mandrel assembly, preferably constructed of a rigid surface material such as steel, includes a first cylindrical core section 28 and an axially spaced, enlarged and hollow core section 30 both of which display outer cross-sectional diameters equal to the inner diameters of undeformed pipe section 16 and enlarged sleeve 12, respectively.

As illustrated best in FIG. 2, enlarged core section 30 tapers outwardly, rather abruptly, at its free end to form a flared surface 32 and a mandrel support surface 34. The mandrel assembly is preferably supported in a horizontal direction by, for example, one or more support bars 36 connected at opposite ends to support surface 34 and stationary supports (not shown). As will be seen hereinafter, the flared surface 32 is utilized in forming the flared end 18 of bell end 10.

Enlarged core section 30 also includes as annular recess 40 adapted to receive the radially inward surface of sealing gasket 24 and an annular ramped surface 42 tapering outwardly and away from recess 40 in the direction of core section 28. As will be seen hereinafter, ramped surface 42 aids in removing the gasket from the recess after formation of bell end 10 about the core sections.

In accordance with the instant invention, mandrel assembly 26 also provides a retractable ramp arrangement 44 which includes an intermediate hollow cylindrical core section 46 coaxial with, positioned between and connecting together the core sections 28 and 30. Intermediate core section 46 preferably has the same outer diameter as enlarged core section 30 and joins core section 28 by an inwardly tapering section 37. In addition, core section 46 includes a plurality of axially extending and equally circumferentially spaced open slots 48 (FIG. 2) extending not quite the entire length of the core section. Each of these slots receives a close fitting ramp bar 50 which is pivotally connected by, for example, pivot pin 52 at one end near the end of core section 46 adjacent core section 28. The ramp bars are movable between a first retracted position, as illustrated in FIGS. 2 and 3, and a second ramped position, as illustrated in FIG. 4.

As shown in FIGS. 2 to 4, the bars 50, when in a first retracted position, extend parallel with the axis of core section 46 and flush with the outer surface thereof. However, when the ramp bars are in their respective second or ramped positions, they extend outward at equal angles with respect to the axis of core section 46 so as to create an effective annular ramped surface leading upward from core section 28 towards enlarged core section 30. The ramp bars may be biased in their first position by, for example, biasing springs (not shown), which may also include means for preventing the bars from pivoting into core section 46. As illustrated best in FIGS. 3 and 4, the pivot connected ends of the bars are preferably rounded at 54. As will be seen hereinafter, this is to facilitate movement of the heated end section of a heat deformable pipe up the ramped surface.

Ramp bars 50 are simultaneously moved from their first retracted positions to their second ramped positions by, for example, a drive arrangement 56 including a piston and cylinder assembly 58 which, for example, may be actuated electrically, hydraulically of pneumatically by means not shown. The cylinder 60 of assembly 58 is suitably mounted (not shown) near the free end of enlarged core section 30 so that the piston 62 of the assembly extends along the axis of and into core section 30. As illustrated in FIG. 3, a substantially cone-shaped ramp bar engaging member 64 is positioned axially within core sections 30 and 46 and supported at its base to the free end of piston 62. The ramp bar engaging member is appropriately dimensioned to move the ramp bars from their axially parallel position to their ramped position, as will be seen below.

When ramp bars 50 are in their first or retracted positions and when piston 62 is in a retracted position, as viewed in FIG. 3, the free inner corners of the ramp bars rest on or in close proximity to the external surface of cone-shaped member 64 between the vertex and base thereof. Upon actuation of piston and cylinder assembly 58, the piston moves from its retracted position, as illustrated in FIG. 3, to an extended position, as viewed in FIG. 4. This causes member 64 to move axially forward towards core section 28 which, in turn, causes the ramp bars 50 to ride up the cone-shaped member and move outwardly to their respective ramped positions. Other suitable means may be utilized for providing this type of movement of the ramp bars.

A conventional suction device (not shown) may be applied to the free open end of core section 30 for producing a low pressure atmosphere within the core sections 30 and 46 which may include a plurality of circumferentially and longitudinally spaced air passages 66. In this manner, as will be seen hereinafter, inwardly direction suction forces are produced around the core sections for aiding in the formation of bell end 10 around the core sections. In addition, the suction may be of such magnitude so as to move ramp bars 50 to their retracted positions without utilizing the aforedescribed biasing means. In this regard, conventional sealing means such as O-rings (not shown) may be provided around the core sections and suitably positioned so as to enable production of the suction forces.

Figure 6:
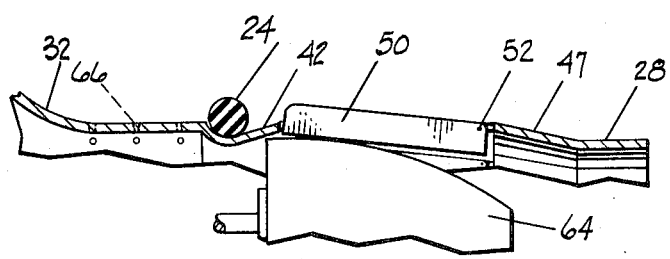
FIGS. 6 to 9 are frontal sectional views of a portion of the mandrel assembly illustrating how the bell end is formed over the assembly.

With mandrel assembly 26 constructed in the aforedescribed manner, attention is now directed to a method of forming bell end 10 in accordance with a preferred embodiment of the present invention. As illustrated in FIG. 6, a sealing gasket such as O-ring 24 is positioned around core section 30 and within annular recess 40. If desired or necessary, the core sections may be suitably lubricated and/or heated to reduce friction. The ramp bars 50 are held in their respective second or ramped positions.

Figure 7:
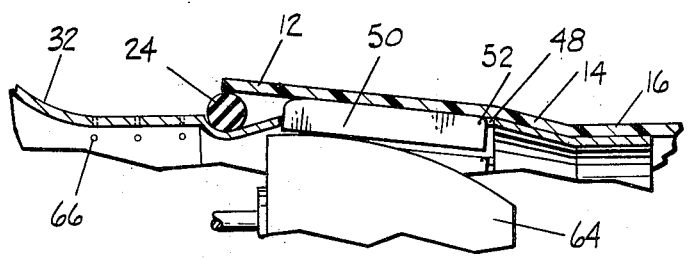
Figure 8:
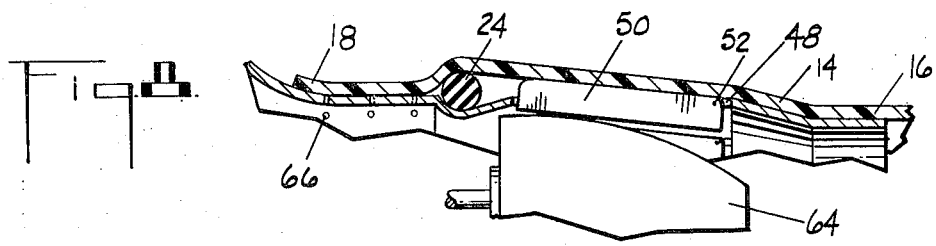

After the end section of an appropriately dimensioned heat deformable pipe has been heated to the range of thermoelastic deformability, which can be provided in any suitable way, the free end of the heated pipe section is positioned concentrically around the free end of core section 28. The end section is then moved forward up tapered section 47, over the rounded edges 54 of the ramp bars 5 and up the latter, as illustrated in FIG. 7. This, of course, causes the end section to deform outwardly and over O-ring 24. As forward movement is continued, the free end of the heated end section moves past the O-ring and deforms inwardly against the flared surface 32 of core section 30. Movement is continued until the free end moves slightly up surface 32, as viewed in FIG. 8. At this time, internal suction and/or externally applied and radially inwardly directed pressure (not illustrated) may be applied to the core sections 30 and 46. Simultaneously, the cylinder 62 and cone-shaped member 64 are moved to their retracted positions for allowing the ramp bars to move back to their retracted axially parallel positions. Actuation of cylinder 60 for retraction of piston 62 and member 64 can be accomplished in any suitable manner. For example, the apparatus (not shown) for positioning the heated end section over the core sections may be operably connected in a conventional way (not shown) for actuating the cylinder when the free end of the heated pipe section reaches a predetermined point on the flare 32 of core section 30.

Figure 9:
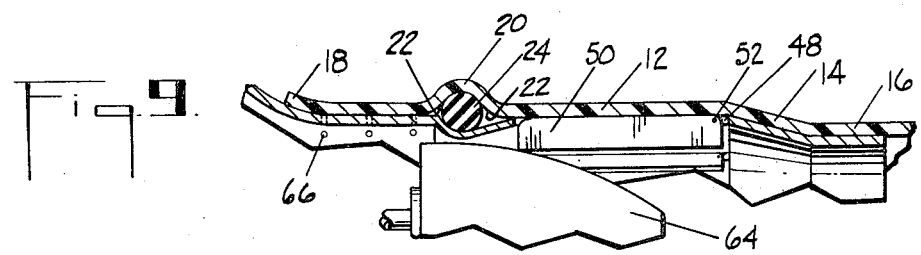

It should be readily apparent from the foregoing that the heated end section is closely contoured around the three core sections 28, 30, and 46, the ramp bars 50 and O-ring 24, as illustrated in FIG. 9, to form bell end 10. The rounded corners 54 of the ramp bars and tapered surface 47 produce the tapered section 14 of member 10 and the flared surface 32 of core section 30 produces the flared end 18. Thereafter, the newly formed bell end is allowed to cool to a temperature below the range of thermoelastic deformability, by for example, a prolonged exposure to ambient temperature or by application of a cooling fluid thereto. Once bell end 10 has sufficiently cooled, it is separated from the mandrel assembly with O-ring 24 remaining disposed within inner circumferential groove 22. During initial separation, the O-ring moves up ramped surface 42 deforming radially outwardly and thereby easily moves out of recess 40.

The heated end section may be positioned around mandrel assembly 26 and separated therefrom after formation of bell end 10 by conventional means such as an apparatus illustrated and described in United States Letters Pat. No. 3,520,047 issued to Muhlner et al. on July 14, 1970. In this regard, while the heated end section was described as moving onto and over the core sections 28, 30 and 46, it should be readily apparent that the core sections could be moved into the heated end section or both the mandrel assembly and end section could be moved simultaneously.

It should be readily apparent from the foregoing that bell end 10 is formed in an uncomplicated and reliable fashion without the necessity of utilizing retainer rings or other such means. In addition, while the bell end has been described with an O-ring as gasket 24, the present method is capable of and contemplates using gaskets of various other cross-sectional profiles such as, for example, V-rings, E-rings, M-rings, C-rings and so on. Further, while the bell end as described, was formed from a cylindrical pipe and displays a circular cross-section, it is to be understood that bell ends having other cross-sectional configurations may be formed in accordance with the present invention. In this regard, the mandrel assembly could be modified in accordance with the cross section configuration of the pipe to be used without departing from the teachings of the present invention.

It is to be understood that variations and modifications of the present invention may be made without departing from the spirit of the invention and that the scope of the invention is not to be interpreted as limited to the specific embodiment disclosed herein, but rather in accordance with the appended claims when read in light of the foregoing disclosure.

What I claim is:

1. A method of forming an inner circumferential groove in a heat deformable pipe, said method comprising: placing a groove forming member around an elongated core and to one side of a predetermined segment thereof; heating at least an end portion of said heat deformable pipe to the range of thermoelastic deformability; positioning one end of said core into the heated end portion of said pipe by relative movement between said core and end portion; providing relative movement between said core and said heated end portion so that said end portion extends around at least a portion of said core including said groove forming member and said predetermined segment; during said last-mentioned relative movement and as said end portion approaches said forming member along said predetermined segment, causing said end portion to deform outwardly so that a longitudinal portion thereof passes over said forming member; after said longitudinal portion has passed over said forming, allowing the portion of said end portion positioned around the predetermined segment of said core to retract inwardly; retracting the end portion positioned on opposite sides of said forming member inwardly so as to produce an inner circumferential groove around said member; and after the temperature of said end portion is below the range of thermoelastic deformability, withdrawing said core from said end portion and forming member by relative movement between said core and end portion.

2. A method according to claim 1 wherein said forming member is a sealing gasket.

3. A method according to claim 2 wherein said sealing gasket is disposed partially within a circumferential recess provided around said core and including at least momentarily deforming said sealing gasket outwardly during the withdrawal of said core from said end portion.

4. A method according to claim 1 wherein the step of causing said end portion to deform outwardly includes moving said end portion up a plurality of circumferentially spaced apart movable ramped surfaces and wherein the step of allowing the portion of said end portion to retract inwardly includes moving said ramped surfaces to a position substantially parallel with the axis of said core.

5. A method according to claim 1 including radially enlarging the end portion of said pipe during formation of said inner circumferential groove.

References Cited

UNITED STATES PATENTS

| 3,728,065 | 4/1973 | Figwer | 425—392 |
| 3,377,659 | 4/1968 | Hucks | 18—19 |
| 3,520,047 | 7/1970 | Muhlner | 29—423 |
| 3,557,728 | 1/1971 | Kuhlemann | 264—318 |

ROBERT F. WHITE, Primary Examiner

R. R. KUCIA, Assistant Examiner

U.S. Cl. X.R.

264—252, 296, 313